E. R. DYE.
ENVELOP MOISTENER.
APPLICATION FILED OCT. 4, 1913.

1,122,266. Patented Dec. 29, 1914.

WITNESSES:
L. B. Woerner
J. H. Swan

INVENTOR:
Edward R. Dye,
By Minturn & Woerner,
Attorneys.

UNITED STATES PATENT OFFICE.

EDWARD R. DYE, OF MONTICELLO, INDIANA.

ENVELOP-MOISTENER.

1,122,266.  Specification of Letters Patent.  Patented Dec. 29, 1914.

Application filed October 4, 1913. Serial No. 793,352.

*To all whom it may concern:*

Be it known that I, EDWARD R. DYE, a citizen of the United States, residing at Monticello, in the county of White and State of Indiana, have invented certain new and useful Improvements in Envelop-Moisteners, of which the following is a specification.

This invention relates to improvements in means for moistening the gum on the flaps of envelops preparatory to sealing the envelops, and the object of the invention is to provide a simple device which will be easily operated and positive and quick in its action whereby envelops to be sealed may be rapidly moistened without danger of offsetting the adhesive material and smearing same over adjacent portions of the envelop to cause a series of the latter when piled for sealing to be stuck together.

I accomplish the above, and other objects which will appear in the specification which follows, by the mechanism illustrated in the accompanying drawing, in which—

Figure 1:
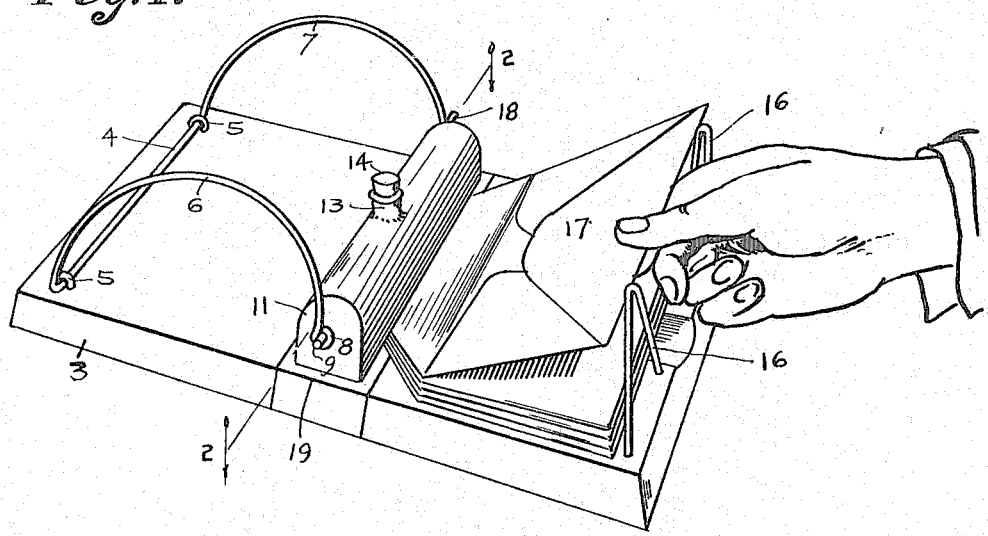
Figure 2:
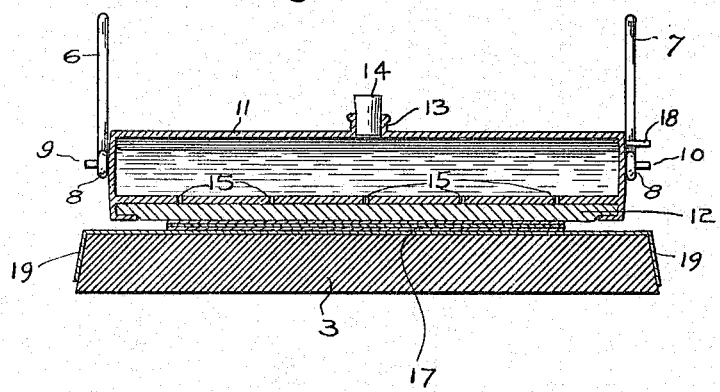

Figure 1 is a perspective view of my invention in operative position, showing envelops in the process of being moistened, and Fig. 2 is a vertical section on the line 2—2 of Fig. 1.

Like characters of reference indicate like parts in the two views of the drawing.

The base 3 of my device may be of wood or metal to suit the taste of the user and conditions of manufacture. Hinged to the outer end of the base is a bail, here shown as formed out of wire and comprising a horizontal member 4 which is laid upon the base 3 and is hinged thereto by the loops or staples 5. The bail also comprises end extensions of the member 4, here shown as bent in semi-circles which are also at right angles to the member 4 and comprise the members 6 and 7. These members 6 and 7 each terminate with eyes 8 to receive the respective trunnions 9 and 10 of a moistener which is thus swingingly supported between and from the ends of said members 6 and 7. The moistener 11 is of sufficient length, between the members 6 and 7, to extend across the gummed portions of the envelop flaps to be moistened. Its lower surface is preferably flat, or substantially so, and is provided with a pad 12 of absorbent material which is kept constantly saturated with water supplied thereto from the hollow interior of the moistener.

The body of the moistener is made hollow in the manner as is clearly shown in Fig. 2 to provide a reservoir for water and access thereto for filling it secured through a top opening 13, provided with a stopper 14. A series of openings 15 are formed through the bottom of the water reservoir, and the pad 12 is kept moist by water supplied through these openings. The walls of the moistener 11 are turned inwardly around the edges of the pad 12 so as to retain the latter in its position at the bottom of the moistener. The moistener 11 thus suspended from the members 6 and 7 can be readily elevated above the base 3 by swinging it around the member 4. This is done in order to introduce the flaps of a stack of envelops under the moistener, in the manner shown in Fig. 1 so that the moistener contacts with the gummed surfaces of the top flap of the pile.

The proper position for the envelops, with relation to the moistener 11, is indicated by standards 16 seated in the inner end of base 3 and extending upwardly to serve as guides against which the envelops 17 are stacked, with their flaps open. When the envelops are thus stacked and the moistener 11, previously raised, is lowered, the pad 12 will be resting upon the gummed portion of the top flap. The body of the top envelop will then be grasped between the fingers and thumb and withdrawn by pulling the flap from under the moistener 11. This operation wets the gummed surface and causes the flap to be stuck when it is folded in closed position by the operator before releasing it. The removal of the top envelop in this manner presents the one next below in contact with the moistener. It will be removed and moistened by the same operation as above described, and the operation will be continued until all of the envelops have been sealed.

In order to keep the moistener 11 from swinging on its trunnions 9 and 10 and thus becoming tilted so as to imperfectly moisten the flaps as they are withdrawn, I provide a stop-pin 18 in the end of the moistener to contact with the member 7 and resist this tendency to swing the moistener 11 on its hinges.

When the base 3 is made of wood as shown in the drawing, I have found it desirable to provide a metal protecting plate 19 under the pad 12 to prevent wetting the wood.

While I have described my invention with more or less minuteness as regards detail of construction and arrangement, and as being embodied in certain precise forms, I do not desire to be limited thereto unduly or any more than is pointed out in the claim. On the contrary I contemplate all proper changes in form, construction, and arrangement, the omission of immaterial elements and the substitution of equivalents as circumstances may suggest or as necessity may render expedient.

I claim:

In an envelop moistener, a base upon which the envelops to be moistened are placed with the gummed surfaces of their opened flaps uppermost, stops to gage the position of the envelops, a hollow water receiving body having end trunnions and a series of bottom outlets, a pad of absorbent material secured to said body under said outlets and moistened from the water in said body, a bail formed out of wire comprising a horizontal member hinged to the end of the base and extensions from each end of said horizontal member bent at right angles to said horizontal member toward the middle of the base and curved upwardly in a semi-circle, said extensions terminating with eyes receiving the end trunnions of the hollow body, and a projection in the end of said body to contact with the curved members of the bail to prevent the tilting of the pad when the envelops are drawn from under it.

In witness whereof, I have hereunto set my hand and seal at Indianapolis, Indiana, this 26th day of September, A. D. one thousand nine hundred and thirteen.

EDWARD R. DYE. [L. S.]

Witnesses:
F. W. WOERNER,
L. B. WOERNER.

Copies of this patent may be obtained for five cents each, by addressing the "Commissioner of Patents, Washington, D. C."